United States Patent [19]

Taylor et al.

[11] Patent Number: 4,791,642

[45] Date of Patent: Dec. 13, 1988

[54] BUFFER ERROR RETRY

[75] Inventors: Michael D. Taylor; Shen H. Wang, both of San Jose, Calif.

[73] Assignee: Amdahl Corporation, Sunnyvale, Calif.

[21] Appl. No.: 920,819

[22] Filed: Oct. 17, 1986

[51] Int. Cl.[4] .............................................. G06F 11/10

[52] U.S. Cl. .......................................... 371/38; 371/13

[58] Field of Search ....................... 371/37, 13, 38, 39, 371/40; 364/200, 900

[56] References Cited

U.S. PATENT DOCUMENTS

| | | | |
|---|---|---|---|
| 4,542,454 | 9/1985 | Brcich | 371/38 |
| 4,604,750 | 8/1986 | Manton | 371/38 |
| 4,625,273 | 11/1986 | Woffindy | 371/38 |
| 4,633,471 | 12/1986 | Peura | 371/38 |
| 4,644,545 | 2/1987 | Gershenson | 371/38 |
| 4,672,613 | 6/1987 | Foxworthy | 371/38 |

*Primary Examiner*—Michael R. Fleming
*Attorney, Agent, or Firm*—Fliesler, Dubb, Meyer & Lovejoy

[57] ABSTRACT

A data processing machine including an instruction and operand processing complex. The instruction and operand processing complex generates results during execution of some instructions. When results are generated, a request to store the results in a high speed cache is generated. The cache receiving the request to store the results includes means for detecting errors in a line in the storage means to which the results are to be stored prior to writing the results to the line. If the line includes an error, a means for correcting the error reads to the line from the cache, corrects the error and restores the line. When the line is restored, the results are written to the cache and a correct ECC code is generated.

13 Claims, 7 Drawing Sheets

I-UNIT/E-UNIT 10
S-UNIT 11
PRIO 12
CACHE CNTRL 13
CACHE
PORTS 14
MAIN STORE 15
16 17 18 19 20 21 22 23 24 25

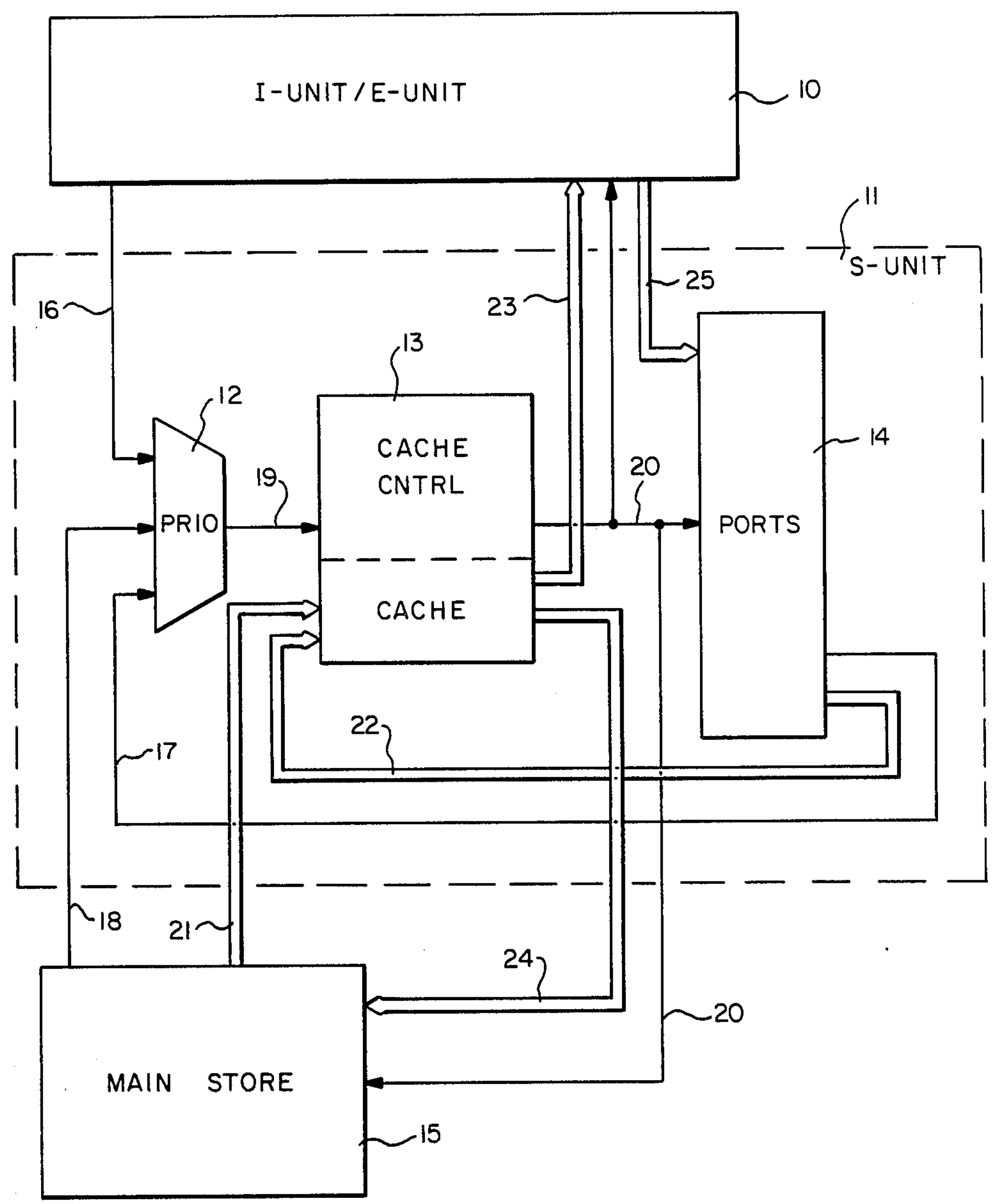
FIG.—1

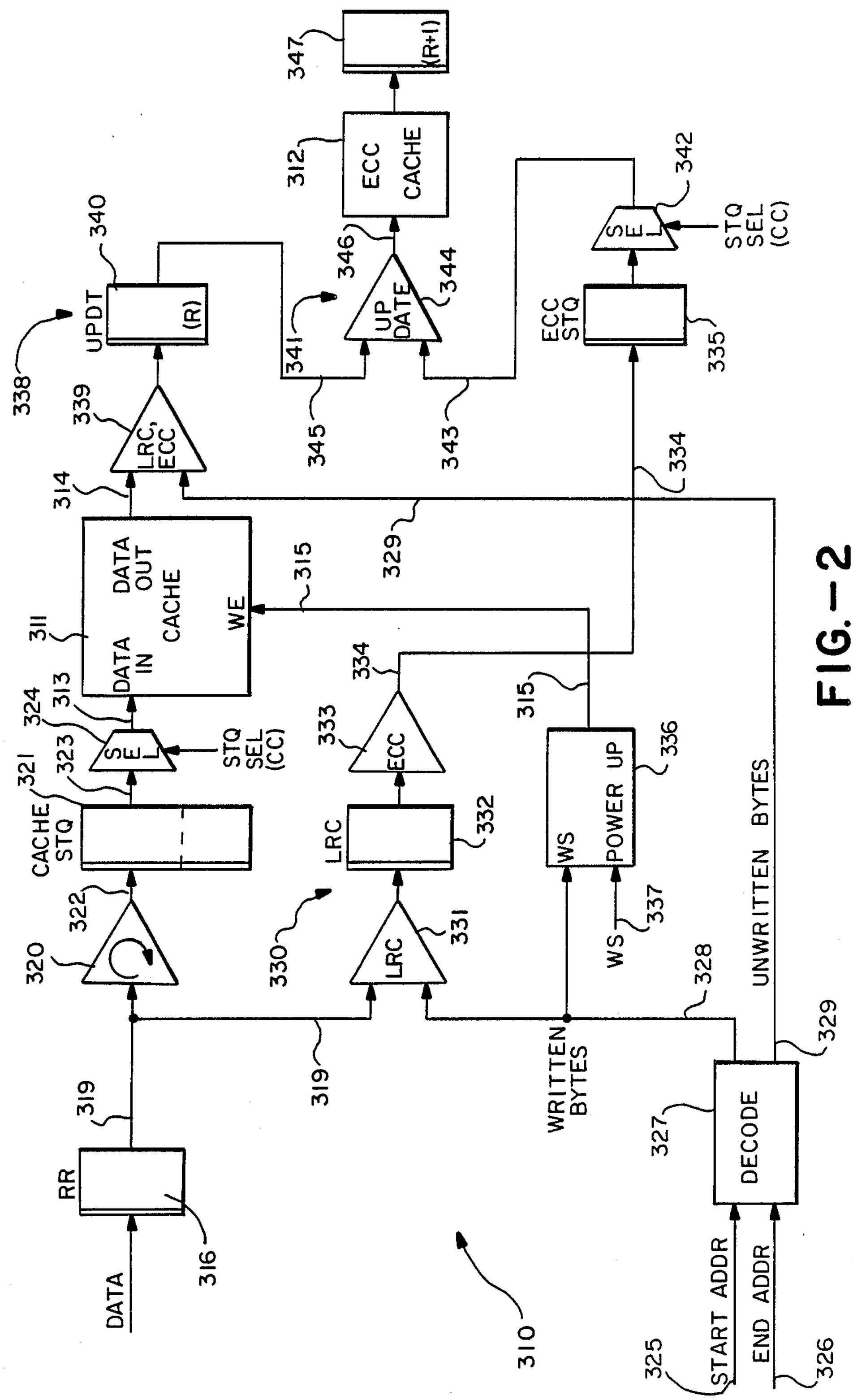
DATA
RR
WRITTEN BYTES
UNWRITTEN BYTES
START ADDR
END ADDR
DECODE
LRC
ECC
CACHE STQ
SEL
STQ SEL (CC)
DATA IN
DATA OUT
CACHE
WE
WS
POWER UP
LRC, ECC
UPDT
(R)
UP DATE
ECC CACHE
(R+1)
ECC STQ
FIG.—2

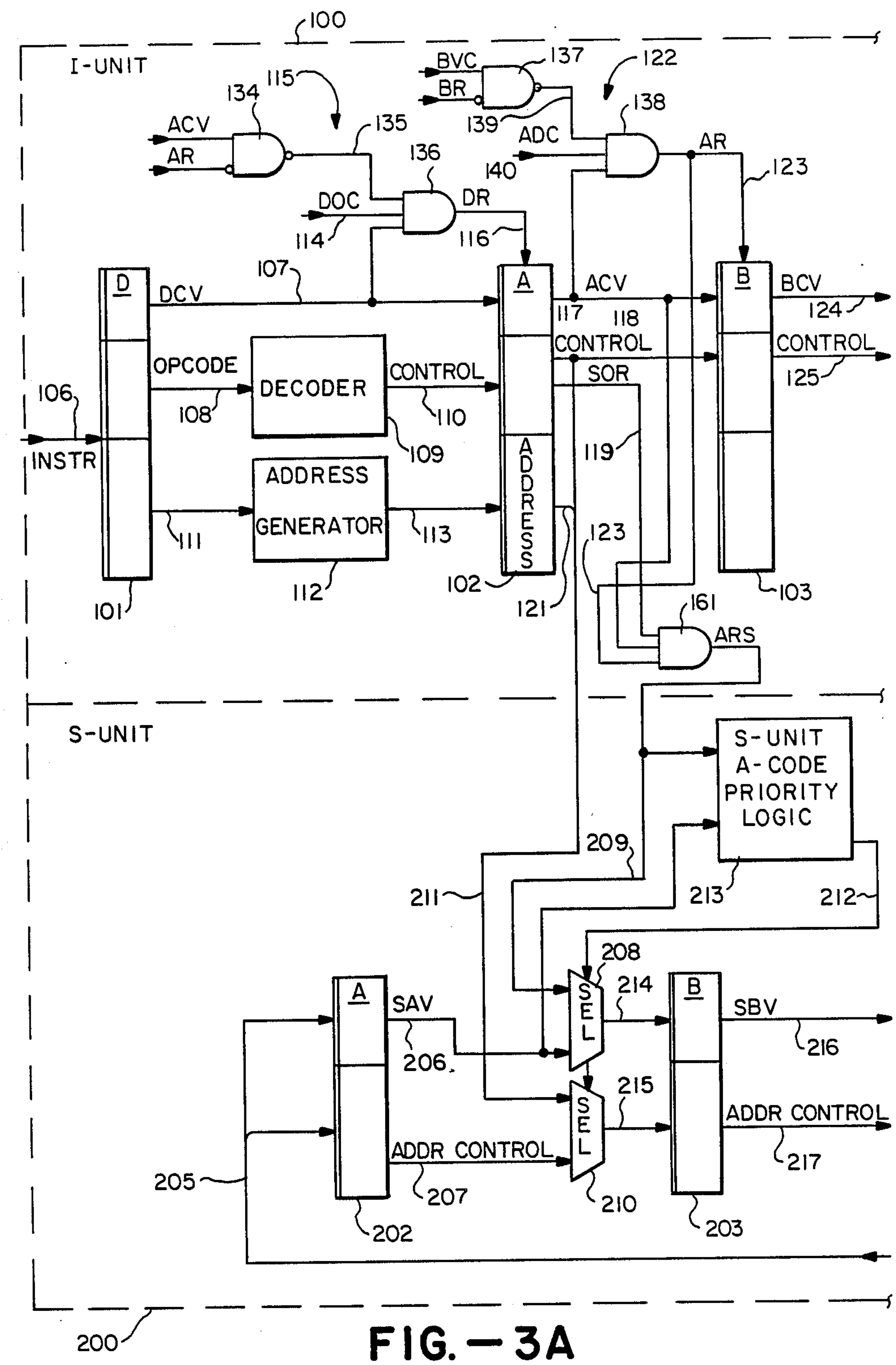
FIG.—3A

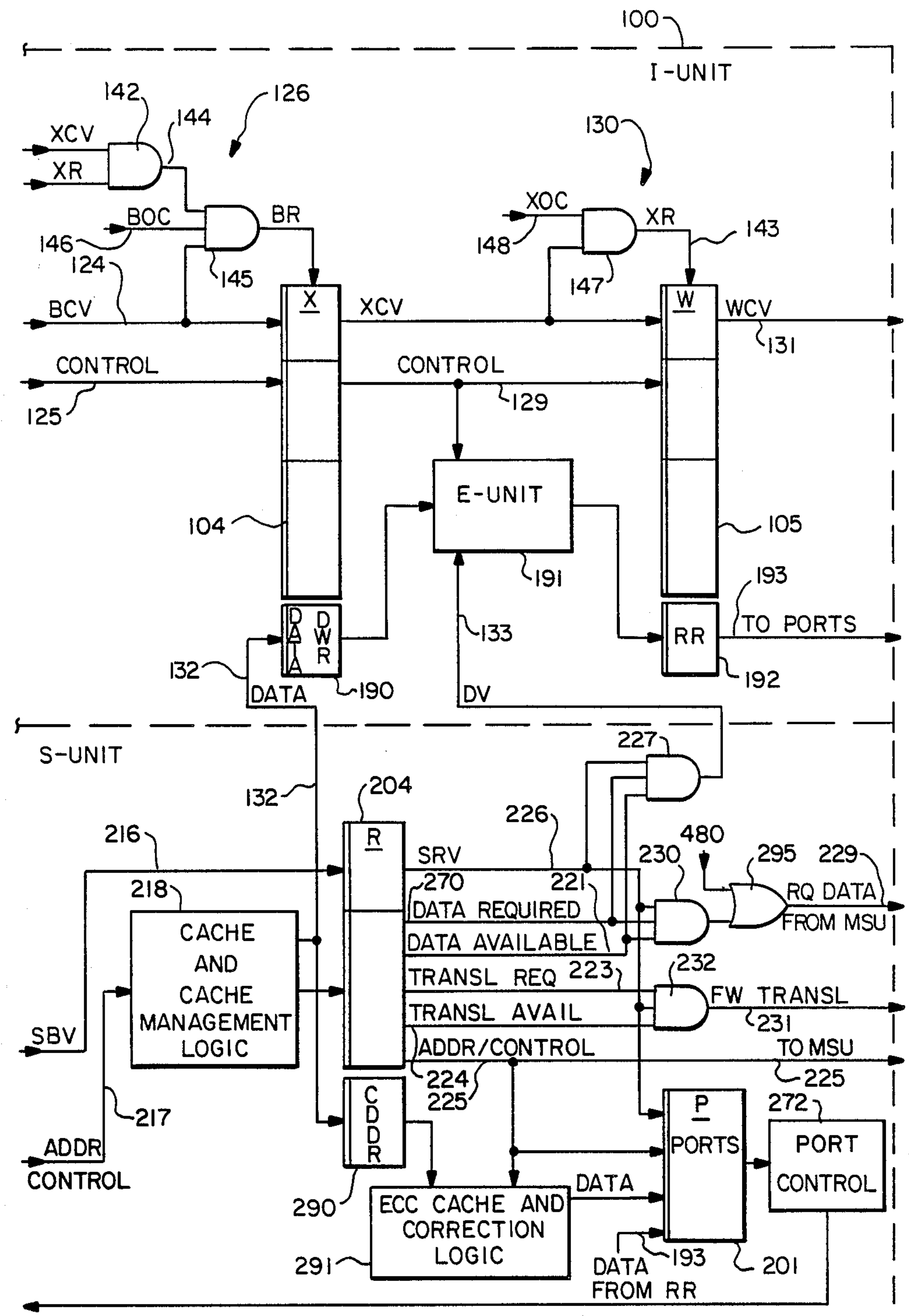
FIG. — 3B

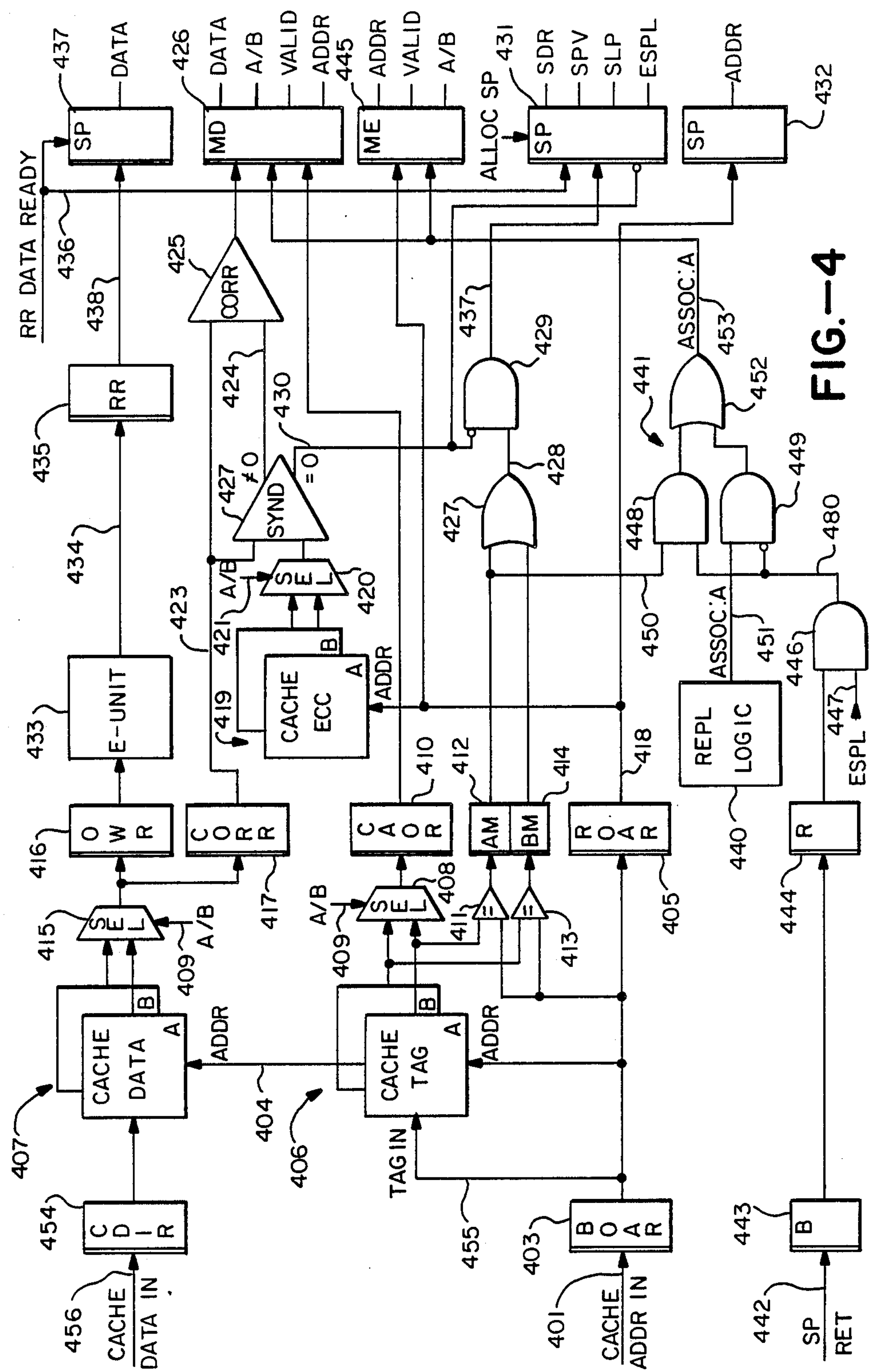
CACHE DATA IN
CACHE ADDR IN
SP RET
CDIR
BOAR
B
CACHE DATA
CACHE TAG
TAG IN
ADDR
SEL
A/B
OWR
CORR
CAOR
AM
BM
ROAR
R
E-UNIT
CACHE ECC
SYND
≠0
=0
REPL LOGIC
ASSOC:A
ESPL
RR
RR DATA READY
SP
MD
ME
DATA
VALID
ADDR
ALLOC SP
SDR
SPV
SLP
ESPL
FIG.—4

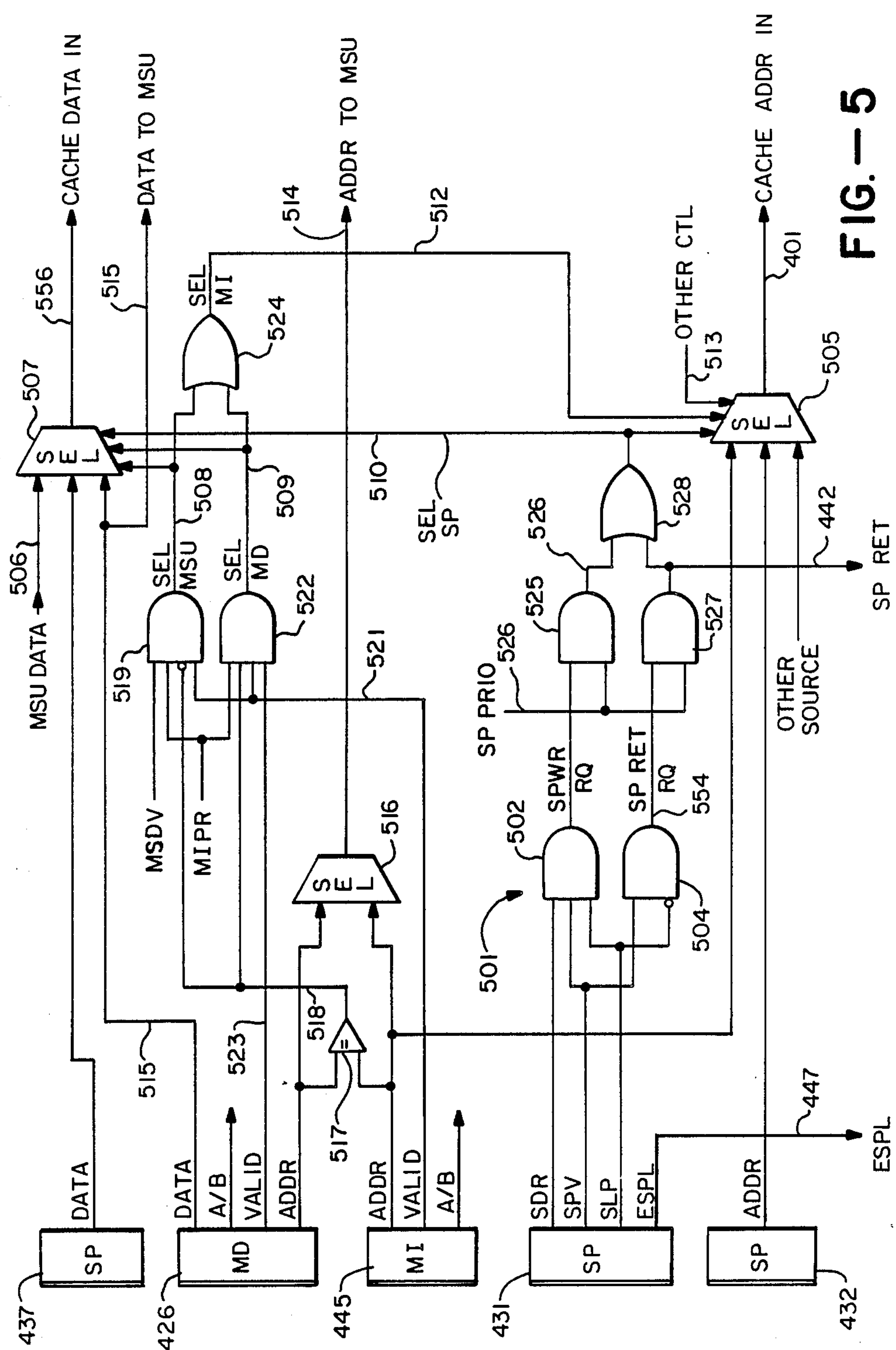
FIG. — 5

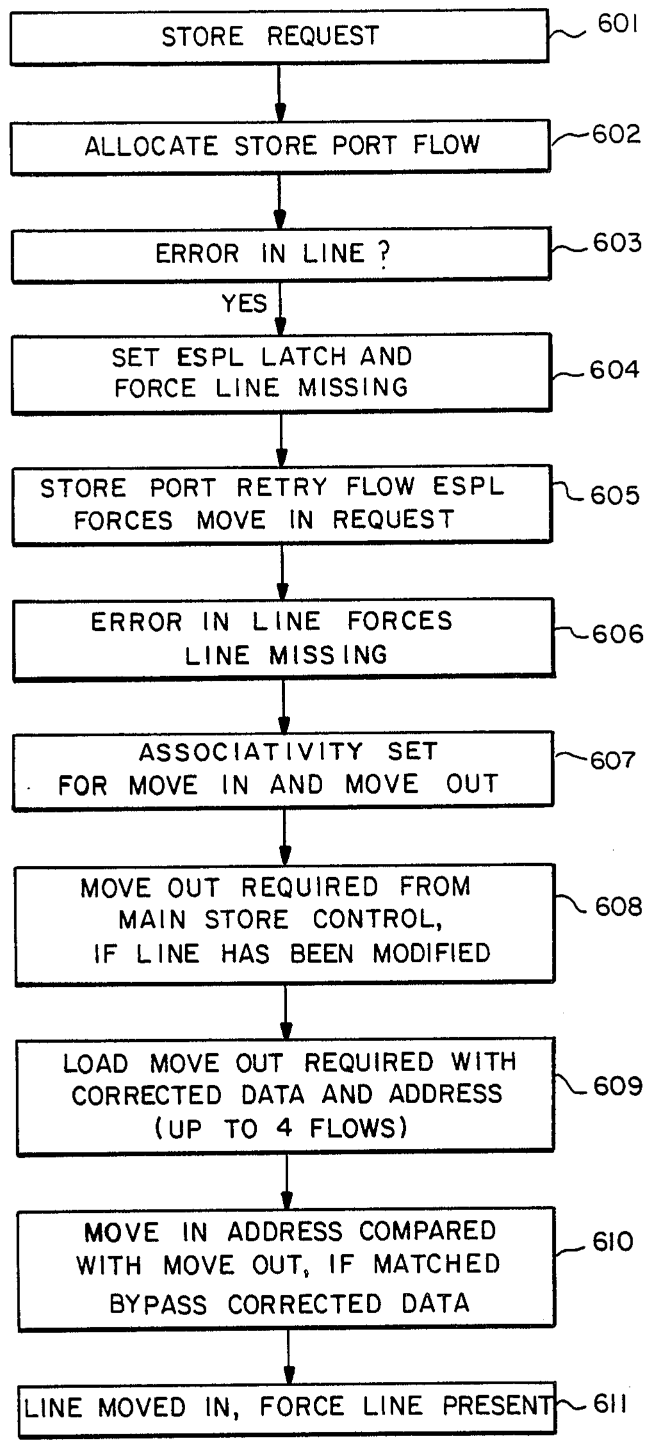
FIG. — 6

BUFFER ERROR RETRY

CROSS-REFERENCES TO RELATED APPLICATIONS

The present patent application is related to the following U.S. patent applications, each of which is owned now and at the time of invention by a common assignee and is incorporated by reference as is fully set forth herein:

(1) CACHE STORAGE QUEUE; Ser. No. 06/900,640; filed Aug. 27, 1988; inventors K. Daberkow, C. Finan, J. Petolino, D. Sobottka, J. Thomas (2) CACHE STORAGE PRIORITY; Ser. No. 920,803; now U.S. Pat. No. 4,722,046 issued Jan. 26, 1983; filed on the same day as the present application; inventors, M. Kasrazadeh, M. Taylor, J. Thomas, C. Finan, J. Petolino.

(3) CACHE ERROR CODE UPDATE; Ser. No. 06/907,665; filed Sept. 15, 1986; inventors C. Finan, T. Isozaki, N. Pang, J. Petolino.

FIELD OF THE INVENTION

The present invention relates to an apparatus and a method for storing data in a cache or buffer memory system that includes error checking and correcting codes for lines of data. In particular, when a line of data stored in the cache or buffer is updated, the present invention insures that an accurate error checking and correcting code is maintained.

BACKGROUND OF THE INVENTION

High speed data processing machines typically include a high speed cache or buffer that stores lines of data that are available for quick access during processing. The lines of data are associated with error checking and correcting codes in order to detect and/or correct errors before data from the cache is utilized by the processing machine.

A high speed cache typically organizes data in sections such as lines for addressing and error checking and correcting (ECC) purposes.

A processing unit in the data processing machine may update only a portion of the line, such as a byte or a word. A problem arises in recomputing the ECC code for the line subject of the partial update. In the prior art, in order to update the ECC code after a partial update, the ECC code for the line prior to the update and at least a portion of the line itself prior to the update is read. This information is then utilized to generate an updated ECC code to be stored with the line after the update.

The system described in the above cross-referenced U.S. patent application entitled CACHE ERROR CODE UPDATE, rather than reading the ECC code for the line prior to the update, reads only the portion of the line that is not being updated during a given write. Based on that portion of the line, a partial ECC code is generated which is combined with an ECC code generated from the update to create a new ECC code for the entire line.

In the prior art and the CACHE ERROR CODE UPDATE schemes, the generation of an accurate ECC code for a line after an update is dependent upon the line in the cache prior to the update. If the line in the cache prior to the update includes an error, the problem of calculating an accurate ECC code for the line after the update is complicated.

SUMMARY OF THE INVENTION

The present invention provides an apparatus and method for detecting errors in a line in the cache prior to an update, and correcting those errors, if possible, so that an accurate ECC code for the line after the update can be generated.

In one aspect, the present invention is a data processing machine including an instruction and operand processing complex. The instruction and operand processing complex generates results during execution of some instructions. When results are generated, a request to store the results in a high speed cache or other storage means is generated. The storage means receiving the request to store the results includes means for detecting errors in a line in the storage means to which the results are to be stored prior to writing the results to the line. If the line includes an error, a means for correcting the error reads the line from the cache, corrects the error and restores the line to the same location in the cache. When the line is restored, the results are written to the cache and a correct ECC code is generated.

In a second aspect the present invention is a method of assuring that a line in the cache to which data is to be written is correct prior to the write involving the steps of:

(1) determining whether an error exists in the line;

(2) if an error exists in the line, then generating a move in request to the main store to replace the line having the error;

(3) forcing the move in to write to the same location in the cache in which the line having the error is stored;

(4) in preparation for the move in, moving out the line having the error from the cache and generating a corrected line if possible; and (5) bypassing the corrected line back to its original location in the cache to complete the move in process.

BRIEF DESCRIPTION OF THE DRAWINGS

FIG. 1 is a block diagram of a data processing system incorporating the present invention.

FIG. 2 is a block diagram schematically illustrating a method for updating an error checking and correcting code for a line in a high speed cache in response to an update of the line.

FIGS. 3A and 3B illustrate schematically a preferred embodiment of the present invention in which the instruction and operand processing complex and the storage unit including a high speed cache are implemented in pipeline fashion.

FIG. 4 and FIG. 5 together provide a more detailed block diagram of the preferred embodiment of the present invention illustrating the buffer error retry mechanism.

FIG. 6 is a flow chart illustrating the method of the present invention.

DETAILED DESCRIPTION

A detailed description of the preferred embodiment of the present invention is provided with reference to the figures. With reference to FIGS. 1 and 2, the data processing environment of the present invention is described. With reference to FIGS. 3A, 3B, 4 and 5, a detailed implementation of the present invention is described.

I. Overview

FIG. 1 illustrates a data processing system incorporating the present invention. The system includes an instruction and operand processing complex 10 that includes an instruction unit and execution unit. In addition, a storage unit 11 is provided that includes a means 12 for selecting from competing requests for storage unit resources, a cache including cache control 13, and a plurality of ports 14 for holding requests for access to the cache 13 or main store 15. Further, the system includes a main store 15, that stores system data. The instruction unit 10, ports 14 and main store 15 each generate requests for storage unit resources on lines 16, 17 and 18, respectively, which are coupled to the means 12 for selecting from competing requests. The selected request is supplied on line 19 on the cache 13. After access to the cache 13 or other action by the cache control, the selected request is passed on line 20 to the ports 14, to the main store 15 or to the instruction and operand processing complex 10.

In response to a selected request on line 19, data is supplied to the cache 13 from the main store 15 across line 21 or from the store ports 14 across line 22. If data is to be read from the cache, it is supplied across line 23 to the instruction and operand processing complex 10 or across line 24 to the main store. Data is supplied to the store ports 14 from the instruction and operand processing complex 10 across line 25.

Means 12 for selecting from among competing requests operate according to priority logic. The priority logic is designed to maintain the flow of the instruction and operand processing complex 10. Thus a request from the instruction unit across line 16 for priority to the storage unit 17 is a relatively high priority request. Requests from the main store across line 18 can be of higher priority when it is necessary for the main store request to be satisfied for instructions waiting in the instruction and operand processing complex 10. Requests from the ports 14 across line 17 are typically relatively low priority to maximize throughput of instructions in the instruction and operand processing complex 10.

FIG. 2 illustrates the portion of a data processing machine 310 that includes a data store 311 (corresponding to cache 13) which stores data in addressable sections, such as lines, and an error code store 312 which stores error codes for corresponding sections in the data store 311.

The data store 311 is implemented in the preferred embodiment as a high speed cache made of random access memory (RAM) devices that receive data at a data-in line 313 and supply data out on a data-out line 314. A write enable signal on line 315 strobes the locations in the RAM's to which the data-in line is supplying data. Valid data is available at the data-out line 314 for all locations in the RAM's that are not enabled by the write enable signal on line 315 to receive data. Therefore, a part of a line of data can be written to the RAM's during the same cycle as a different part of the same line is read out on the data-out line 314. RAM's having this characteristic are known in the prior art.

Data is supplied to the data store 311 in the preferred embodiment from a result register 316, typically located in an execution unit of the data processing machine. The output of the result register on line 319 is supplied to line rotation logic 320 that controls the loading of the data into a port such as storage queue register 321. A detailed description of a cache storage queue including a plurality of registers such as the register 321 is provided in the above-referenced co-pending U.S. patent application entitled CACHE STORAGE QUEUE. The cache storage queue register 321 stores the data from the rotation logic across line 322 for supply across line 323 to a store queue selector 324. The store queue selector 324 operates as described in the incorporated application entited CACHE STORAGE QUEUE. The output of the store queue selector 324 supplies data on line 313 into the data store 311.

Address information, including a starting address on line 325 and an ending address on line 326, is supplied to a means 327 for decoding the address information to generate a first signal on line 328 indicating the part of the line to be written by the data in the result register 316. In addition, a second signal is generated on line 329 by the decoding means 327, indicating the part of the line that is not being written. As is well known in the art, the value of the first signal may indicate both the written and unwritten parts so that the same value is supplied as well for the second signal, or vice-versa. The first signal from line 328 is supplied as one input to an error code generating means designated generally by 330. The second input to the error code generating means 330 is the output of the result register 316 across line 319. A longitudinal redundancy code generator 331 generates columnwise parity over the bytes in the update, as described below and in the above cross-referenced application entitled CACHE ERROR CODE UPDATE, and loads the columnwise parity into the register 332. The output of the register 332 is supplied to an ECC code generator 333 which logically reduces the columnwise parity code and supplies a resulting first partial error code across line 334 to an ECC store queue register 335. An ECC store queue register is maintained for each of the registers in the cache storage queue such as register 321. However, for the purposes of this invention, only one ECC store queue register is shown.

As the update is being selected from the cache storage queue register 321 for writing to the cache 311, the first signal from line 328 that identifies the bytes to be written in the line are supplied to a write strobe power-up logic 336. A second input to the write strobe power-up logic 336 is a clock signal designated the write strobe on line 337 for clocking the RAM's in the data store 311. The output of the write strobe power-up logic 336 is supplied on line 315 as the write enable input to the cache 311. As described above, when the write enable signal on line 315 enables writing to a specified part of a data line, data from the line is available on the data-out line 314. The part of the data line being written during the read is of an uncertain value.

When the store queue selector 324 supplies data from the cache storage queue 321 to the cache 311 to be written, a second error code generating means designated generally by 338 reads the balance of the line on line 314 and receives the second signal on line 329 identifying the parts of the line that are not being written. In response to the second signal, the part being written is masked off in the logic 339. The error code generating means 338 includes logic for generating an error code by taking columnwise parity and then reducing the columnwise parity to an ECC code in an error code generating logic 339. The output of the error code generating logic 339 is supplied to an error code update register 340.

At this point, the error code update register 340 stores a second partial error code over the portion of the line that is not being written by the update and the ECC store queue register 335 stores the first partial error code over the part of the line being written by the update.

In order to generate the updated ECC code and write it into the error code store 312, a means, designated generally as 341, is included for combining the first partial error code from register 335 with the second partial error code from register 340.

The first partial error code stored in the ECC store queue register 335 is selected by a store queue selector 342 after its corresponding data has been selected into the cache by the selector 324. The output of the selector 342 is supplied on line 343 as one input to the ECC update logic 344. The second partial error code from the ECC update register 340 is supplied on line 345 as a second input to the update logic 344. In the update logic 344, the partial error codes are combined to generate a full error code for the line. The full error code is supplied across line 346 to the error code store 312. In a following cycle, the error code store 312 can be accessed to read the error code for the updated line into a register 347.

In operation, the data processing apparatus 310 operates in a pipeline fashion. Two flows of the pipeline are typically used, designated a store flow for storing data into the cache storage queue 321 and corresponding ECC store queue 335 and a write flow for writing data from the cache storage queue 321 into the cache 311 and from the corresponding ECC store queue 335 into the ECC cache 312. The pipeline flow in the storage unit includes cycles P-A-B-R where each letter in the flow represents a cycle of the pipeline. The result register 316 is loaded asynchronously from the execution unit. The cache store queue register 321 and the longitudinal redundancy code register 332 are loaded at least as early as the B cycle of the cache write flow. The cache is accessed after the B cycle and before the R cycle. The ECC update register 340 and the ECC store queue register 335 are loaded at least as early as the R cycle of the same cache write flow. Access to the ECC cache 312 occurs after the R cycle.

For a store flow into the cache storage queue, the ECC characters over the bytes that are being written to the cache are generated by the error code generating means 330 and stored in the ECC store queue register 335. Legal lengths of updates to be sent to the cache 311 are consecutive bytes 0–8, 16, 32 or 64 (a line being 64 bytes long). The following diagram illustrates a store flow:

<table>
<tr><th>P</th><th>A</th><th>B</th><th>R</th><th>STORE flow</th></tr>
<tr><td></td><td></td><td>|–|</td><td></td><td>Allocate DATA into Cache STQ</td></tr>
<tr><td></td><td></td><td></td><td>|–|</td><td>Allocate ECC into ECC STQ</td></tr>
</table>

When writing from the cache store queue register 321 and the ECC store queue register 335 into the cache and ECC cache, respective, two situations can occur. First, in a machine having the legal lengths as discussed above, a write of 16, 32 or 64 bytes can occur or a write of 8 or fewer bytes can occur.

The cache store queue register 321 can accumulate successive stores into the register in legal lengths of 32 bytes or 16 or fewer bytes because in the embodiment shown, the error code is generated over 16 byte sections. For writes of 16 or 32 bytes, the error code from the ECC store queue register 335 is complete and the error code from the update register 340 is invalid so the update logic 344 supplies the error code directly from the ECC store queue 335 to the ECC cache 312. The 16 or 32 byte write flow is illustrated as follows:

<table>
<tr><th>P</th><th>A</th><th>B</th><th>R</th><th>WRITE flow</th></tr>
<tr><td></td><td></td><td>|–|</td><td></td><td>Write DATA into Cache from Cache STQ</td></tr>
<tr><td></td><td></td><td></td><td>|–|</td><td>Write ECC into ECC RAMs from ECC STQ</td></tr>
</table>

For write flows of 8 or fewer bytes, the bytes that are not being written to the cache 11 are read out of the cache on line 314 to the error code generating logic 339 during the B cycle. A partial error code is generated over those bytes and stored in the update register 340. In this case, this partial error code from register 340 is supplied on line 345 to the update logic 344 and combined with the partial error code from the ECC store queue register 335 and written into the error code store 312. The write flow for 8 or fewer bytes is illustrated as follows:

<table>
<tr><th>P</th><th>A</th><th>B</th><th>R</th><th>WRITE flow</th></tr>
<tr><td></td><td></td><td>|–|</td><td></td><td>Write bytes into Cache RAMs from Cache STQ</td></tr>
<tr><td></td><td></td><td>|–|</td><td></td><td>Read unwritten bytes from Cache RAMs</td></tr>
<tr><td></td><td></td><td></td><td>|–|</td><td>Write updated ECC into ECC RAMs</td></tr>
</table>

In the preferred embodiment, the error code is an ECC code over 8-byte doublewords. An error checked section of the cache includes two 8-byte doublewords for a total of 16-bytes, a "quarterline". The error code store 312 stores two ECC codes for each 16-byte quarterline. The ECC characters for each 8-byte doubleword are generated from a longitudinal redundancy code. The longitudinal redundancy code is generated by aligning the 8-bytes in a matrix in which each byte is a row and taking even parity over each column in the matrix. Table 1 illustrates the generation of longitudinal redundancy code (LRC) bits for a sample group of 8 bytes.

TABLE 1

| | | bit position | | | | | | | | |
|---|---|---|---|---|---|---|---|---|---|---|
| | | 0 | 1 | 2 | 3 | 4 | 5 | 6 | 7 | P |
| byte position | 0 | 0 | 1 | 1 | 0 | 0 | 0 | 0 | 1 | 0 |
| | 1 | 0 | 0 | 0 | 0 | 0 | 0 | 0 | 0 | 1 |
| | 2 | 1 | 1 | 1 | 1 | 1 | 1 | 1 | 1 | 1 |
| | 3 | 0 | 1 | 0 | 1 | 0 | 1 | 0 | 1 | 1 |
| | 4 | 1 | 1 | 1 | 1 | 1 | 1 | 1 | 1 | 1 |
| | 5 | 1 | 1 | 1 | 1 | 1 | 1 | 1 | 1 | 1 |
| | 6 | 1 | 1 | 1 | 1 | 1 | 1 | 1 | 1 | 1 |
| | 7 | 1 | 1 | 1 | 1 | 1 | 1 | 1 | 1 | 1 |
| LRC bits | | 1 | 1 | 0 | 0 | 1 | 0 | 1 | 1 | 1 |

The longitudinal redundancy code logic 331 and error code generating logic 339 perform this function over the data of the update and the unwritten part of the section, respectively. The LRC bits themselves are stored in the register 332 for the generation of the first partial error code in the embodiment shown. However, the LRC bits are not independently registered in the logic 339 for timing considerations.

The error checking and correcting (ECC) bits are generated according to Table 2. The Hamming matrix of Table 2 is used to generate the ECC bits C0–C5. C0 is equal to LRC bit 1 exclusive-OR LRC bit 2. ECC bit C1 is equal to LRC bit 0 exclusive-OR LRC bit 2. ECC bit C2 is equal to LRC bit 4 exclusive-OR LRC bit 5.

ECC bit C3 is equal to LRC bit 3 exclusive-OR LRC bit 5. ECC bit C4 is equal to LRC bit 7 exclusive-OR LRC bit P. ECC bit C5 is equal to LRC bit 6 exclusive-OR LRC bit P.

For example, using the LRC bits generated in Table 1, the ECC bits for the 8-bytes of Table 1 are 111000:

TABLE 2

| | | LRC bits | | | | | | | | |
|---|---|---|---|---|---|---|---|---|---|---|
| | | 0 | 1 | 2 | 3 | 4 | 5 | 6 | 7 | P |
| ECC bits | C0 | | x | x | | | | | | |
| | C1 | x | | x | | | | | | |
| | C2 | | | | | x | x | | | |
| | C3 | | | | x | | x | | | |
| | C4 | | | | | | | | x | x |
| | C5 | | | | | | | x | | x |

The error checking and correcting code generated as described above has a property that a partial error code over bytes being updated can be combined with a partial error code over the bytes that are not changed in the update to generate a full updated error code. For example, consider the 8 bytes shown in Table 1. The LRC bits are 110010111 and the ECC characters are 111000. Suppose bytes 3, 4 and 5 are changed so that the resulting 8 bytes are as shown in Table 3:

TABLE 3

| | | Updated Section: Bit | | | | | | | | |
|---|---|---|---|---|---|---|---|---|---|---|
| | | 0 | 1 | 2 | 3 | 4 | 5 | 6 | 7 | P |
| Byte | 0 | 0 | 1 | 1 | 0 | 0 | 0 | 0 | 1 | 0 |
| | 1 | 0 | 0 | 0 | 0 | 0 | 0 | 0 | 0 | 1 |
| | 2 | 1 | 1 | 1 | 1 | 1 | 1 | 1 | 1 | 1 |
| | 3 | 0 | 0 | 0 | 0 | 0 | 0 | 0 | 0 | 1 |
| | 4 | 0 | 1 | 0 | 0 | 1 | 0 | 0 | 1 | 0 |
| | 5 | 1 | 0 | 1 | 1 | 0 | 1 | 1 | 0 | 0 |
| | 6 | 1 | 1 | 1 | 1 | 1 | 1 | 1 | 1 | 1 |
| | 7 | 1 | 1 | 1 | 1 | 1 | 1 | 1 | 1 | 1 |
| LRC | | 0 | 1 | 1 | 0 | 0 | 0 | 0 | 1 | 1 |

The resulting LRC bits due to the update for all 8 bytes are 011000011 and the resulting ECC characters are 010001.

Using the algorithm according to the present invention, the part of the error checked section being updated is used to generate a partial error code. Thus, as shown in Table 4, the longitudinal redundancy code over the written bytes is 111111111 and the partial error code over the written bytes is 000000.

TABLE 4

| | | Bit | | | | | | | | |
|---|---|---|---|---|---|---|---|---|---|---|
| | | 0 | 1 | 2 | 3 | 4 | 5 | 6 | 7 | P |
| Byte | 0 | | | | | | | | | |
| | 1 | | | | | | | | | |
| | 2 | | | | | | | | | |
| | 3 | 0 | 0 | 0 | 0 | 0 | 0 | 0 | 0 | 1 |
| | 4 | 0 | 1 | 0 | 0 | 1 | 0 | 0 | 1 | 0 |
| | 5 | 1 | 0 | 1 | 1 | 0 | 1 | 1 | 0 | 0 |
| | 6 | | | | | | | | | |
| | 7 | | | | | | | | | |
| LRC" | | 1 | 1 | 1 | 1 | 1 | 1 | 1 | 1 | 1 |
| ECC" | | | 0 | 0 | | 0 | 0 | | 0 | 0 |

The part of the error checked section that is not being updated, that is the unwritten bytes of the section, are shown in Table 5. As can be seen, the longitudinal redundancy code for the unwritten bytes is 100111100 and the partial error code for the unwritten bytes is 010001.

TABLE 5

| | | Bit | | | | | | | | |
|---|---|---|---|---|---|---|---|---|---|---|
| | | 0 | 1 | 2 | 3 | 4 | 5 | 6 | 7 | P |
| Byte | 0 | 0 | 1 | 1 | 0 | 0 | 0 | 0 | 1 | 0 |
| | 1 | 0 | 0 | 0 | 0 | 0 | 0 | 0 | 0 | 1 |
| | 2 | 1 | 1 | 1 | 1 | 1 | 1 | 1 | 1 | 1 |
| | 3 | | | | | | | | | |
| | 4 | | | | | | | | | |
| | 5 | | | | | | | | | |
| | 6 | 1 | 1 | 1 | 1 | 1 | 1 | 1 | 1 | 1 |
| | 7 | 1 | 1 | 1 | 1 | 1 | 1 | 1 | 1 | 1 |
| LRC" | | 1 | 0 | 0 | 1 | 1 | 1 | 1 | 0 | 0 |
| ECC" | | | 0 | 1 | | 0 | 0 | | 0 | 1 |

The combination of the partial error code for the written bytes with the partial error code for the unwritten bytes is generated by taking a bitwise exclusive-OR of the partial ECC codes. The result is equal to 010001, which is exactly the error code predicted from Table 3.

It should be appreciated that other error codes can be used that have the property that partial codes can be combined to generate a full error code.

As can be seen, when updating lines in a cache in this manner, it is important that the unupdated portion of the line in the cache that is used to generate a partial ECC code contains no errors in order to avoid the possibility of an undetected or uncorrectable error being written into the cache.

With reference to FIGS. 3A, 3B, 4 and 5, an implementation of the preferred embodiment for detecting and correcting any possible errors in the line of the cache before an update is written is provided.

II. Implementation

FIGS. 3A and 3B illustrate the interface between an instruction unit 100 and a storage unit 200 in the preferred embodiment of the present invention along with the implementation of the present invention.

Instruction unit 100 is implemented as a five-stage pipeline processor. The five stages are:

(1) D-Cycle—The instruction to be executed is decoded by the instruction unit.

(2) A-Cycle—The addresses of operands for the instruction are generated by the instruction unit and passed if appropriate to the storage unit.

(3) B-Cycle—The operands are fetched from either the instruction unit general purpose registers or the storage unit cache.

(4) X-Cycle(s)—The execution unit opcodes corresponding to the operation specified by the instruction are executed in the execution unit. More than one X-Cycle may be necessary depending on the complexity of the execution operation.

(5) W-Cycle—The result of the instruction is supplied to the storage unit for storage in the cache or to the instruction unit for storage in general purpose registers.

In FIGS. 3A and 3B, the instruction unit is illustrated schematically along the top half of the figures as a D-stage register 101, an A-stage register 102, a B-stage register 103, an X-stage register 104, and a W-stage register 105.

An instruction is received across line 106 from an instruction fetch mechanism or other source (not shown). It is latched into the D-Cycle register 101 during the first step of the flow. The D-cycle register supplies a D-cycle command valid signal DCV on line 107. An opcode from the instruction is supplied across line 108 to a decoder 109 which supplies control signals across line 110. Information in the instruction identifying an operand for use by the opcode on line 108 is supplied across line 111 to address generation logic 112. The address generation logic supplies an address across line 113 in a form for access to the S-Unit 200. Upon completion of the functions required during the D-Cycle, a D-Cycle operation complete signal is generated on line 114 by the instruction unit. D-Cycle release logic 115 detects conditions explained below to generate a D-Cycle release signal on line 116 which releases the instruction from the D-Cycle to the A-Cycle.

The A-Cycle register 102 receives the D-Cycle command valid signal on 107, the control on line 110 and the address on line 113 and supplies an A-Cycle command valid signal ACV on line 117, control signals on line 118, a signal indicating that an S-Unit operation is required, SOR, on line 119, a signal indicating that the instruction in the A-Cycle register 102 is in its first A-Cycle FAC on line 120, and address information on line 121. When A-Cycle operations are complete, the AOC signal is generated on line 140. The A-Cycle command valid signal, control signals and address information pass down the pipeline to the B-Cycle register 103 in response to the generation of an A-Cycle release signal AR on line 123 by the A-Cycle release logic 122.

A B-Cycle command valid signal BCV is supplied through the B-Cycle register 103 on line 124, the control information is passed on on line 125.

Proceeding to FIG. 3B, the B-Cycle command valid signal BCV on line 124 and the control on line 125 are supplied to the X-Cycle register 104. When B-Cycle operations are complete, the BOC signal is generated on line 146. B-Cycle release logic 126 generates a B-Cycle release signal BR on line 127 to clock the R-Cycle register 104 to receive the data. An X-Cycle command valid signal XCV is supplied on line 128 from the X-Cycle register 104 as well as control information on line 129. When X-Cycle operations are complete, a XOC signal is generated on line 148.

A W-Cycle register 105 receives the X-Cycle command valid signal XCV from line 128 and the control from line 129 in response to X-Cycle release logic 130. A W-Cycle command valid signal WCV is supplied by the W-Cycle register 105 on line 131 and so on along the pipe.

The X-Cycle register 104 also includes a section for receiving data across line 132 from the storage unit 200. Further, a data valid signal DV is supplied on line 133 from the storage unit 200 when valid data is supplied to the R-Cycle register 104.

The D-Cycle release logic (FIG. 2A) includes NAND-gate 134 that receives as input the A-Cycle command valid signal ACV from line 117 and the A-Cycle release signal AR from line 123. The A-Cycle release signal is inverted at the input of gate 134 on line 135. In addition, AND-gate 136 is included in the D-Cycle release logic receiving as inputs the signal on line 135, the D-Cycle operation complete signal DOC from line 114 and the D-Cycle command valid signal DCV from line 107.

The A-Cycle release logic 122 includes NAND-gate 137 receiving as inputs the B-Cycle command valid signal BCV from line 124 and the inverted B-Cycle release signal BR from line 127. The output of gate 137 is supplied on line 139. AND-gate 138 receives as input the output of gate 137 from line 139, the A-Cycle operation complete AOC signal on line 140 and the A-Cycle command valid signal ACV on line 117, and supplies its output as the A-Cycle release signal AR on line 123.

The B-Cycle release logic on line 126 includes NAND-gate 142 which receives the X-Cycle command valid signal XCV from line 128, the X-Cycle release signal XR from line 143 as inputs and supplies a signal on line 144. In addition, the B-Cycle release logic 126 includes AND-gate 145 receiving the signal from line 144, B-Cycle operation complete signal BOC on line 146 and the B-Cycle command valid signal BCV from line 124 as inputs. The output of gate 145 is the B-release signal BR on line 127.

The X-Cycle release signal on line 143 is supplied as output from AND-gate 147 which receives as inputs the X-Cycle operation complete signal XOC on line 148 and the X-Cycle command valid signal XCV from line 128.

The S-Unit 200 operates in a four-stage pipeline with cycles P-A-B-R. The P-Cycle refers to the cycle in which address information for a flow of the storage unit pipe is latched into ports 201.

The next cycle of the storage unit pipeline is an A-Cycle followed by the B- and R-Cycles. Thus a storage unit includes an A-Cycle register 202, a B-Cycle register 203, and an R-Cycle register 204. During the A-Cycle, an address and control information is loaded from the ports 201 across line 205 to A-Cycle register 202. The A-Cycle register 202 supplies an S-Unit A-Cycle valid signal SAV across line 206. Address and control information is supplied across line 207 from the A-Cycle register 202.

A control signal selector 208 is included which receives as inputs the SAV signal across line 206 and an A-Cycle request for storage signal ARS across line 209. An address and control selector 210 receives the address and control information across line 207 and address and control information from lines 118 and 121 in the I-Unit 100 across line 211.

The selectors 208 and 210 are controlled by a priority signal on line 212 from S-Unit A-Cycle priority logic 213. The inputs to the S-Unit A-Cycle priority logic 213 include the S-Unit A-Cycle valid signal SAV on line 206, and the A-Cycle request for storage unit signal ARS on line 209 and other controls (not shown).

The B-Cycle register latches a selected control signal from selector 208 on line 214 and the selected address and control information from selector 210 on line 215.

Out of the B-Cycle register 203 is supplied an S-Unit B-Cycle valid signal SBV on line 216 and address and control information on line 217. The address and control information on line 217 is supplied as shown in FIG. 2B to the cache and cache management logic 218. The S-Unit B-Cycle valid signal SBV on line 216 is supplied to the R-Cycle register 204. The cache and cache management logic 218, in response to the address and control information from line 217, retrieves data from the cache if available, and supplies it on line 132 to the instruction unit 100. In addition, cache control signals are generated by the cache management logic supplied to the R-Cycle register 204 across line 219. The R-Cycle register 204 latches the control signals including the "data required" signal on line 220, the "data available" signal on line 221, a "translation required" signal on line 223, a "translation available" signal on line 224 and address and control information on line 225. In addition, an S-Unit R-Cycle valid signal SRV is supplied on line 226.

The data valid signal DV on line 133 is supplied from AND-gate 227 which receives as inputs the S-Unit R-Cycle valid signal SRV from line 226, the "data required" signal from line 220, and the "data available" signal from line 221. In addition, gate 227 is enabled or disabled by a staged prefetch request signal as shown in FIGS. 3A–3B.

If data required to be fetched from the main storage unit because it is not present in the cache, a request data from main storage unit signal is generated by AND-gate 230 on line 229. The output of AND-gate 230 on line 229 is supplied to OR-gate 295. The second input to OR-gate 295 is the signal on line 480 from FIG. 4. The output of OR-gate 295 signals the request to move in data from the main storage unit. Gate 230 receives as inputs the S-Unit R-Cycle valid signal SRV on line 226, the "data required" signal on line 220, and the inverse of the "data available" signal on line 221. Thus, if data is required and not available for a valid request, or if there is an error in a store port line subject of a store port retry as indicated on line 480, the data is requested from the main storage unit. The address and control information is supplied on line 225 to the main storage unit. More details of the preferred embodiment of the main store requests, and cache management logic are provided with reference to FIGS. 4 and 5.

In addition, the cache management logic 218 may require other resources to make the data in the cache available for use by the I-Unit 100. For instance, a valid translation of a virtual address must be available in the cache management logic before valid data can be supplied. Thus the control signals "translation required" and "translation available" are generated. If translation resources in the main storage unit are required then a signal on line 231 is generated by AND-gate 232. The inputs to gate 232 include the S-Unit R-Cycle valid signal SRV on line 226, the "translation required" signal on line 223 and the inverse of the "translation available" signal on line 224. In the preferred embodiment, the "data available" signal is not generated in the S-Unit 200 if a translation is required.

The instruction unit 100 presents requests to the storage unit 200 from its A-Cycle register 102 across line 211 during the A-Cycle of the instruction unit pipeline which always corresponds to the A-Cycle of the storage unit pipeline at the instant the request is presented. The storage unit returns data and/or other information to the instruction unit 100 in its R-Cycle from register 204 across lines 132 and 133 upon completion of the request. If all information and resources necessary for completion of the request are available at the time instruction unit 100 makes the request, the presentation of the data valid signal DV indicating completion of the operation will be made just two cycles after the request is issued, that is, in the X-Cycle of the instruction unit pipeline.

The storage unit 200 has a pipeline that is free-running meaning that it does not have the capability of interlocking for instructions that are unable to complete within a given cycle. If the requested operation is not completed in its initial pass of the pipe, then it must be recycled. The recycling of a request must begin from the P-Cycle from one of the plurality ports 201 of the storage unit pipeline.

The instruction unit 100 receives data from the cache 218 across line 132 into an operand word register 190. Data from the operand word register is supplied to an execution unit 191 in conjunction with the data valid signal across line 133. Upon completion of the execution of an instruction in the execution unit, resulting data is supplied to a result register 192. The result register is coupled across line 193 directly to the ports 201. As mentioned above, the ports 201 include a plurality of storage queue registers described in detail in the above cross-referenced U.S. Patent Application entitled CACHE STORAGE QUEUE.

As mentioned above, when an instruction being processed in the instruction unit 100 will generate resulting data for storage to the cache, two flows of the storage unit pipeline are utilized. The first flow results in allocation of the store port to receive the resulting data when generated. The second flow occurs when the store port and the cache are ready for a write of the data to the cache.

According to the present invention, the cache 218 during an allocation flow supplies data from the line to which the results are to be written to a cache data out register 290. In the next cycle, the data from the line through the cache data out register 290 is supplied to an error checking and correcting code cache and correction logic system 291. In addition, the address and associated control information from line 225 is supplied to the ECC cache and correction logic module 291. In the event that an error is detected in the line as supplied from the cache data output register 290, the data is corrected if possible and written to a port among the plurality of ports 201. The port utilized in this instance is described in more detail with reference to FIGS. 4 and 5. When corrected data is written to the port, the port control 292 detects the condition and requests access to the storage unit pipeline to store the corrected data to the cache 218 prior to a write flow from the allocated queue port.

FIG. 4 illustrates in more detail, the implementation of the storage unit beginning with the B-Cycle through the loading of the ports. A B-Cycle operand address register 403 which corresponds to the B-Cycle register 203 in FIG. 3A. FIG. 4 is described by illustrating the sequence of elements involved in a store port allocate flow followed by a write to the cache flow and a buffer error retry flow, called a store port retry in the preferred embodiment.

For a store port allocate flow, a cache address is supplied on line 401 to the B-Cycle operand address register 403. From the B-Cycle operand address register 403, the address is supplied across line 404 to an R-Cycle operand address register 405. During the B-cycle, the address on line 404 is supplied to a cache tag array 406 and to a cache data array 407. In response to the address, the cache tag array 406 is accessed to generate a system address that identifies the line of data to which the results are to be stored for the store port to be allocated. Implementation of a cache tag is well within the skill of the art.

In the preferred embodiment, the tag array is organized into two associativities or subunits, labeled associativity A and associativity B. The output of the cache tag associativities are supplied in parallel to selector 408. The selector 408 is controlled by an associativity control signal on line 409. The output of the selector 408 is supplied to a cache address out register 410.

In addition, the output of the associativity A of the cache tag is supplied to a comparator 411. The other input to comparator 411 is the address from line 404. If the addresses match, an A associativity match signal is latched in a register 412. Likewise, the output of the associativity B of the cache tag is supplied to a comparator 413 which receives as a second input the address from line 404. If the addresses match, a B associativity match signal is latched in register 414.

In parallel with the access to the cache tag, the address on line 404 is supplied to the cache data array 407. The cache data array 407 likewise includes two subunits, associativity A and associativity B. Data accessed in response to the address on line 404 is supplied from each associativity to selector 415. The selector 415 is controlled by the associativity control on line 409. The data supplied from the cache 407 is supplied to the operand word register 416 located in the execution unit and to the cache data out register 417 located in the storage unit. The cache data out register 417 corresponds with the register 290 shown in FIG. 3B.

Thus, at the end of the B-Cycle, a copy of the line of data identified by the address on line 404 is stored to the cache data out register 417, a copy of the system address that uniquely identifies the data in the main store is latched in the cache address out register 410 and an indicator whether the line is present in the A or B associativities is latched in registers 412 and 414, respectively.

Replacement logic 440 is included that operates according to a least recently used algorithm or other algorithm for managing use of associativities in the cache as is known in the art. In addition, according to the present invention, logic 441 for overriding the output of the replacement logic 440 is included as described in more detail with reference below.

During the allocate flow, the address from the R-Cycle operand address register 405 supplied on line 418, is provided to a cache ECC array 419. The cache ECC array also includes an associativity A and an associativity B. The outputs of each of the associativities is supplied to a selector 420 which is controlled by the associativity control signal from line 409 staged by a one cycle supplied on line 421. The selected ECC code is supplied to a syndrome generating logic 422. In addition, the syndrome generating logic 422 receives the data from the cache data out register 417 across line 423. In response to the data and the ECC code, an error checking and correcting syndrome is generated according to well known principles using the ECC code described above. If an error is detected, the syndrome will be non-zero and supplied across line 424 to error correction logic 425. In addition, a copy of the data from the cache data out register 417 on line 423 is supplied to the correction logic 425. If possible, the error is corrected in the correction logic 425 and supplied to a move out port 426. If the error is not correctable, then a machine check condition is initiated.

For allocation of the store port, the indication of whether the line is present in the cache from the A associativity match register 412 and the B associativity match register 414 are supplied to OR-gate 427. The output of OR-gate 427 indicates whether the line is present in the cache. The output of OR-gate 427 is supplied across line 428 to AND-gate 429. The second input to AND-gate 429 is the inverse of a signal across line 430 from the syndrome generating logic 422 that indicates whether the syndrome is equal to zero. If the syndrome is not equal to zero, the signal on line 430 is false, whereas if the syndrome is equal to zero, the signal on line 430 is true. In addition, the inverse of the signal on line 430 is supplied to a store port control register 431 indicating that an error in the store port line (ESPL) has been detected.

The AND-gate 429 effectively overrides the signal on line 428 indicating that the line is present in the cache to which data is to be stored from store port when an error is detected in the data in the line. Thus, the output of the AND-gate 429 is supplied across line 432 to the store port control register 431 indicating whether the store port line is present (SLP). As described below, when the store port line is not present, the store port control initiates a request to main store to move a line of data into the cache to satisfy the request to store data that is residing in the store port.

In sum, at the end of a store port allocate flow in which an error is detected on a line to which the results are to be stored, the store port is allocated with an indication that the line is not present and that an error is present in the store port line by control bits ESPL and SLP in the store port control register 431. The address is supplied from line 418 to the store port address register 432 in parallel with the loading of the control bits in the control register 431.

With the store port allocated, it awaits the resulting data to be supplied from the result register. Thus, the execution unit 433 receives data from the operand word register 416, if appropriate, and generates resulting data across line 434 for supply to a result register 435. When the data in the result register 435 is ready, a control signal is generated across line 436 for supply to the store port data register 437. In response to the result register data ready signal on line 436, the data is latched across line 438 from the result register 435 to a store port data register 437. Likewise, the result register data ready signal on line 436 is supplied to the store port control register 431 and stored (SDR). System control indicates whether the store port includes valid address and data and loads a store port valid signal (SPV).

The store port includes control register 431, address register 432 and data register 437, which are loaded with the data, the addresses and the control signals, including signals that indicate whether the line is present in the cache and whether an error has been detected in the store port line.

As described below, store port logic shown in FIG. 5 generates under certain conditions a store port retry request. The store port retry request is supplied on line 442 to a B-Cycle latch 443. The address from the store port address register 432 is selected into the B-Cycle address register 403. From the B-Cycle address register 403, the address is latched into the R-Cycle address register 405 while the store port retry signal is staged to the R-Cycle latch 444.

The R-Cycle operand address register 405 is connected across line 418 to supply the address to a move in port 445.

The store port retry signal in the R-stage latch 444 is supplied to the logic 441 for overriding the output of the replacement logic 440. The logic 441 includes AND-gate 446 which receives as inputs the error in store port line signal ESPL across line 447 from the store port control register 431 and the output of the R-Cycle latch 444 of the store port retry signal. The output of AND-gate 446 is supplied on line 480 as one input to AND-gate 448 and, in inverted form, as one input to AND-gate 449. Further, as shown in FIG. 3B the signal on line 480 through OR-gate 295 results in a request to main store for a move-in. The second input to AND-gate 448 is the output of the A associativity match latch 412 across line 450. The second input to AND-gate 449 is the output of the replacement logic 440 accross line 451. The output of the replacement logic on line 451 is true when the replacement logic indicates that the associativity to be selected is associativity A. The outputs of AND-gates 448 and 449 are supplied respectively as inputs to OR-gate 452. The output of OR-gate 452 is a resulting associativity signal on line 453. The resulting associativity signal on line 453 is supplied to both the move out port register 426 and the move in register 445. Thus, during a store port retry flow, when there is an error in the store port line, the signal on line 453 will indicate the same associativity as the line in the cache prior to the move out.

During a store port write flow, the address is selected from the store port address register 432 into the B-Cycle operand address register 403 at the same time that data from the store port data register 437 is selected to the cache data in register 454. The address is supplied across line 404 to the cache data array 407 and the data is written to the cache. A portion of the address on line 404 is supplied as a tag to the cache tag array and the tag is written to the cache tag array 406. ECC code is updated as described above with reference to FIG. 2.

FIG. 5 illustrates the port control that generates the store port retry request according to the present invention (corresponding to block 292 in FIG. 3B).

The ports shown at the right side of FIG. 4 appear on the left in FIG. 5 with identical reference numerals for consistency. Thus, the store port data register 437, control register 431 and address register 432 are shown. In addition, the move out register 426 and move in register 445 are shown.

Once allocated, store ports generate a store port write request or a store port retry request according to the present invention. Thus, logic 501 is included for generating the respective requests. The logic 501 includes AND-gate 502 which receives as inputs the store port data ready signal SDR, the store port valid signal SPV and the store port line present signal SLP. When all three control signals from the control register 431 are true, the store port write request is generated on line 503. The logic, in addition, includes AND-gate 504 which receives as inputs the store port valid signal SPV and the inverse of the store port line present signal SLP. Thus, when the store port is valid and the line present signal is false, a store port retry request is generated on line 554.

The move out register 426 is loaded with data from the line in the cache which is to be moved out to make space for data that is being moved in. In addition, the address of the line to be moved out is stored in the move out register. The data in the move out register is corrected data from the correction logic 425.

The address of a move in request generated in response to a line missing state in the store port is located in the move in register 445.

Data is supplied on the cache data in line 456 from either the store port data register 437, the move out register 426 or from the main storage unit across line 506. Each of these sources of data is supplied to a selector 507 which is controlled by a select main storage unit signal on line 508, a select move out signal on line 509 or a select store port signal on line 510.

The address information on the cache address in line 401 is supplied from either the store port address register 432, the move in register 445, or from some other source contending for cache resources across line 511. Each of these sources of addresses is supplied to selector 505 which is controlled by the select store port signal on line 510, a select move in signal on line 512 and other control signals supplied on line 513.

When a move in request is generated, address information is supplied on an address to main storage unit line 514. In addition, data is supplied on line 515 to the main storage unit to service a move out request. The address to main storage unit line 514 is supplied at the output of a selector 516. The inputs to selector 516 include the address from the move out port 426 and the address from the move in port 445. Control of the selector 516 is accomplished by priority logic determining whether the move out or move in request will occur at a given time.

The logic for the generation of the control signals that operate to select data for the cache data in line 456 and addresses on the cache address in line 401 is shown in FIG. 5. The logic includes a comparator 517 which compares the addresses in the move out and move in registers 426, 445. If they match, a signal is generated on line 518. In addition, the logic includes AND-gate 519. The inputs to AND-gate 519 include a main store data valid signal supplied from the main storage unit when valid data is available on line 506, a move in priority grant on line 520, the inverse of the address match signal on line 518, and a move in valid signal on line 521. The output of AND-gate 519 results in a select main storage unit signal on line 508.

The logic further includes AND-gate 522. The inputs to AND-gate 522 include the move in priority grant on line 520, the address match signal on line 518, the move in valid signal on line 521, and the move out valid signal on line 523. The output of AND-gate 522 results in a select move out signal on line 509.

In addition, the logic includes OR-gate 524. The inputs to OR-gate 524 include the select main storage unit signal on line 508 and the select move out signal on line 509. The output of OR-gate 524 is the select move in signal on line 512.

The logic for generating control signals for the selectors 507 and 505 further includes AND-gate 525. The inputs to AND-gate 525 include store port priority grant on line 526 and the store port write request signal on line 503. The output to AND-gate 525 is a signal indicating that a store port write request has received priority on line 526.

The logic further includes AND-gate 527. The inputs to AND-gate 527 include the store port retry request on line 554 and the store port priority signal on line 526. The output of AND-gate 427 is the store port retry signal on line 442 indicating a priority grant to a store port retry request.

The logic further includes OR-gate 528. The inputs to OR-gate 528 include the signal on line 526 and the signal on line 442. The output to OR-gate 528 is a select store port signal on line 510.

FIG. 6 is a flow chart illustrating the method of operation of the present invention.

The process begins with a store request from the execution unit (Block 601). In response to a store request, an allocate store port flow of the storage unit pipeline is taken (Block 602). In the allocate store port flow, the error checking and correcting logic 422 detects whether an error is in the line to which the data is to be stored (Block 603).

When the store port is allocated, if an error is detected (Block 603), the error in store port line signal ESPL is latched and the line missing state is forced by gate 529 for the allocated store port (Block 604).

In response to the line missing state, a store port retry flow is initiated as indicated by the output of gate 504 in FIG. 5. During the store port retry flow, the error in store port line signal ESPL on line 447 forces a request to move in data from the main store (Block 605) as indicated by the signal on line 480 at the output of gate 446. The signal on line 480, supplied through OR-gate 295 shown in FIG. 3B, results in the assertion of the signal on line 229 to load the move in register 445 (Block 605).

An error will be detected in the line again which forces the line missing state in the store port (Block 606). The error in store port line signal ESPL on line 447 results in a setting of the associativity of the move in and move out registers through override logic 441 so that the line is moved back to the same location in the cache from which it was moved out (Block 607).

In response to the move in request, the move out request is generated from the main store control if the line has been modified in the cache. If the line has not been modified, then the data is moved in from the main storage unit (Block 608).

In response to the move out flow, which can take up to four flows for an entire line of the cache, the move out register 426 is loaded with corrected data and the address of the line (Block 609).

Once the move out is completed and the main store controller has completed its checks to maintain the integrity of the line at other locations of the system, then the move in is initiated in which the move in address is compared with the address in the move out register in comparator 517. If the addresses match, the corrected data is bypassed into the cache from the move out register (Block 610). When the line is moved in, the line present signal is forced to indicate that the line is present for a write from the store port to the cache (Block 611).

In sum, the method of the present invention of assuring that the line in the cache to which data is to be written is correct involves the steps of:

(1) determining whether an error exists in the line;

(2) if an error exists in the line, then generating a move in request to the main store to replace the line having the error;

(3) forcing the move in to write to the same associativity in the cache in which the line having an error is stored;

(4) in preparation for the move in, moving out the line having the error from the cache and generating a corrected line if possible; and (5) bypassing the corrected line back to its original location in the cache to complete the move in process.

After the line is moved in, a line present indication is stored in the store port and a normal write from the store port to the cache takes place in which the ECC code generated is assured to be correct.

As described in the above reference CACHE STORAGE QUEUE application, the preferred embodiment will include a plurality of storage ports and logic controlling the priority of the storage ports. However, in order to clarify presentation of the present invention, only one storage port is described here.

CONCLUSION

Thus, according to the present invention, an apparatus is provided that prevents the storing of data to a line in a cache or other storage means that already includes an error.

This apparatus is particularly important when partial writes into the cache use data from the unwritten portions of the cache to determine new values of error codes. If an error exists in one of the data bits not being updated, then the error code information will be generated based on erroneous data and information indicating the failing bit will be incorrect. This results in making some single bit failures uncorrectable. The present invention makes use of the store ports to provide a means of correcting the cache data before performing a write operation to a line with bad data. This decreases the likelihood of damaging the operation of the machine due to the single bit failures in the cache.

The foregoing description of the preferred embodiment of the present invention has been presented for the purposes of an enabling disclosure. It is not intended to be exhaustive or to limit the invention to the precise form disclosed. Obviously, many modifications and variations will be apparent to practitioners skilled in this art. The embodiment was chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

We claim:

1. A data processing apparatus having an instruction and operand processing complex that generates resulting data words and associated addresses in response to an instruction, and that generates requests for storage of the resulting data words at locations identified by the addresses, comprising:

data storage means for storing lines of data at locations identified by addresses, the lines of data each including a plurality of data words;

error detecting means, connected to receive the requests for storage of resulting data words and coupled to the data storage means, for detecting errors in a line of data to which the resulting data word is to be stored;

error correcting means, coupled to the error detecting means and the data storage means, for correcting detected errors in the line of data in the data storage means to which the resulting data word is to be stored;

port means, connected to receive the resulting data words from the instruction and operand processing complex and coupled to the data storage means, for staging the resulting data word for transfer to the data storage means; and control means, coupled to the port means and the error detecting means, for controlling transfer of the resulting data word to the data storage means so that the resulting data word is transferred when there are no detected errors, or after detected errors are corrected, in the line of data to which the resulting data word is to be stored.

2. The apparatus of claim 1, wherein the error detecting means includes:

error code storage means for storing error codes for corresponding lines of data in the data storage means at locations identified by the addresses identifying the locations of the corresponding lines; and means, responsive to the error code corresponding to the line identified by the address in the request, for generating an error signal indicating whether an error in the line is detected.

3. The apparatus of claim 1, wherein the error correcting means includes:

means for generating a corrected line of data; and means for transferring the corrected line of data to the location identified by the address in the request.

4. The apparatus of claim 1, further including means, coupled to receive requests for storage of resulting data words and to the storage means, for generating error correction codes in response to the resulting data word and the line of data in the addressed location in parallel with the transfer of the resulting data to the addressed location.

5. A data processing apparatus comprising:

processing means for processing a sequence of instructions to generate resulting data words including means, connected to receive the sequence of instructions, for decoding an instruction in the sequence to generate control signals, the control signals including a request for storage of a resulting data word to a data location with an address identifying the data location, and other requests for access to a data location with corresponding addresses; and storage means for storing lines of data at data locations identified by addresses, the lines of data each including a plurality of data words;

storage port means, connected to receive resulting data word from the processing means and having at least one register for holding the address and resulting data word from the execution of an instruction, for generating a request for access to a data location identified by the address in the at least one register to store the resulting data word;

access control means, connected to receive a plurality of requests for access to a data location, including the requests for storage of resulting data words and corresponding addresses from the storage port means and from the decoding means, for processing a sequence of requests for access to the storage means including means for allocating the at least one register to a requesting instruction in the storage port means in response to a request from the decoding means to store a resulting data word;

error detecting means, connected to receive the requests for storage of resulting data words from the decoding means and coupled to the storage means, for detecting errors in the line of data identified by the address in a request for storage of a resulting data word;

error correcting means, coupled to the error detecting means and the data storage means, for correcting detected errors in the line of data at the location in the storage means identified by the address in the request for storage of a resulting data word; and control means, coupled to the storage port means and the error detecting means, for controlling transfer of the resulting data word to the storage means so that the resulting data is transferred when there are no detected errors, or after detected errors are corrected, in the line of data at the data location identified by the address.

6. The apparatus of claim 5, wherein the storage port means includes a plurality of registers for holding an address and resulting data from a plurality of requests for storage of resulting data from the decoding means.

7. The apparatus of claim 5, wherein the error detecting means includes:

error code storage means for storing error codes for corresponding lines of data in the storage means at locations identified by the addresses identifying the locations of the corresponding lines; and means, responsive to the error code corresponding to the line identified by the address in the request, for generating an error signal indicating whether an error is detected.

8. The apparatus of claim 5, wherein the error correcting means includes:

means for generating a corrected line of data; and means for transferring the corrected line of data to the location identified by the address in the request.

9. The apparatus of claim 5, further including:

main storage means, coupled to the storage means, for storing copies of the lines of data stored in the storage means;

wherein the storage port means includes:

means for storing a line presence signal indicating whether the line of data identified by the address in a request to store the resulting data word from the decoding means is present in the data location in the storage means identified by the address; and the error correcting means further includes:

means for generating a corrected line of data for correctable errors, means, connected to receive the corrected line of data and the address in the request, for holding the corrected line for transfer to the storage means, means, coupled to the storage port means and responsive to the detection of an error, for forcing the line presence signal to indicate that the line is not present; and the control means further includes:

means, responsive to an indication by the line presence signal that the line is not present, for requesting transfer of the copy of the line of data identified by the address in the at least one register from the main storage means, means, responsive to a request to transfer the copy, for comparing the address in the means for holding the corrected line of data with the address that identifies the copy of the line to be transferred to determine whether the addresses match, means, connected to receive the copy of the line from the main storage means and the corrected line from the means for holding, for selecting in response to a match the corrected line of data from the means for holding for supply to the data storage means.

10. The apparatus of claim 5, further including means, coupled to receive requests for storage of resulting data words and to the storage means, for generating error correction codes in response to the resulting data word and the line of data in the addressed location in parallel with the transfer of the resulting data to the addressed location.

11. In a data processing system including a main store storing lines of data and an instruction and operand processing complex that generates resulting data words and associated addresses in response to an instruction and transfers the resulting data for storage at locations identified by the addresses in a storage unit, the storage unit storing copies of lines of data, each line including a plurality of data words, for access by the instruction and operand processing complex and having means for detecting errors and correcting correctable errors in the copies, a method for generating an error correction code for a line of data in the storage unit to which resulting data word is transferred comprising the steps of:

determining whether the copy of the line of data at the location identified by the address associated with resulting data word contains an error;

if an error is contained in the copy of the line, then initiating a move in transfer of a new copy of the line from the main store to the location identified by the address associated with resulting data word;

in preparation for the move in transfer, moving the copy of the line that contains the error out of its location in the storage unit and correcting the copy if the error is correctable to generate a corrected copy;

selecting the corrected copy for transfer back to its location in the storage unit to complete the move in transfer; and generating an error correction code in response to the resulting data word, and to the corrected copy, if an error was detected, or the original copy of no error was detected.

12. The method of claim 11, wherein the storage unit includes a plurality of subunits, each having a location identified by an address associated with resulting data word and the copy of the line containing an error is stored in the identified location in one of the plurality of subunits, and further including the step of:

forcing the move in transfer to the identified location in the one subunit.

13. The method of claim 11, wherein the step of initiating a move in transfer includes the step of loading a move in register with address information identifying the line of data and further including the steps of:

loading a move out register with the corrected copy and address information identifying the corrected copy;

comparing the address information in the move in register with the address information in the move out register to detect a match; and in response to a match, enabling the step of selecting.

* * * * *